United States Patent [19]
Clay

[11] 3,718,378
[45] Feb. 27, 1973

[54] TAIL-SHAFT BEARING ASSEMBLY

[75] Inventor: John Armstrong Clay, Sale, Cheshire, England

[73] Assignee: Turnbull Marine Design Company Limited, Cheshire, England

[22] Filed: June 1, 1970

[21] Appl. No.: 42,049

[30] Foreign Application Priority Data

June 5, 1969  Great Britain.....................28,606/69

[52] U.S. Cl. .....................308/36.1, 115/34, 308/15
[51] Int. Cl..............................F16c 33/74, F16c 35/02
[58] Field of Search...308/36.1, 15, DIG. 12; 115/34, 115/0.5; 114/0.5; 277/34.3

[56] References Cited

UNITED STATES PATENTS

| | | | |
|---|---|---|---|
| 1,831,857 | 11/1971 | Goodnow | 308/31 |
| 3,540,405 | 11/1970 | Clay | 115/34 R |
| 3,236,570 | 2/1966 | Satterthwaite | 308/15 |
| 3,337,222 | 8/1967 | Smith et al. | 277/34.3 |
| 3,433,540 | 3/1969 | Schneider | 308/36.1 |
| 3,470,842 | 10/1969 | Clay | 115/34 |

*Primary Examiner*—Milton Kaufman
*Assistant Examiner*—Barry Grossman
*Attorney*—Brady, O'Boyle and Gates

[57] ABSTRACT

In a propeller shaft bearing arrangement having a split bearing extending through an opening in the stern frame of a ship, one part of the bearing being removable while the ship is afloat and a seal being provided for preventing the entry of water through the opening, there is provided the improvement that the other part of the bearing may be adjusted in position or removed while the ship is afloat. An inflatable seal is provided for preventing the entry of water during the removal of the other part of the bearing. Jacks, rollers and a drive mechanism are provided for facilitating the removal of the other part, and taper wedges for securing the other part in its normal position.

13 Claims, 5 Drawing Figures

TAIL-SHAFT BEARING ASSEMBLY

The present invention relates to propeller shaft bearing arrangements comprising a split bearing mounted in the stern frame of a ship and supporting a propeller shaft extending through an opening in the stern frame, the bearing comprising a first bearing part which is removable from the shaft without disturbance of the shaft to allow inspection of the shaft while the ship is afloat, and a further bearing part which supports the shaft during the removal of the first bearing part.

It has previously been proposed to form the further bearing part in one piece with the stern frame or as a part of a housing containing the bearing and inserted into the opening from aft of the stern frame. These previously proposed bearing arrangements have the disadvantage that it is not possible to adjust or remove the whole of the bearing, e.g., for servicing or replacement, while the ship is afloat.

According to the present invention, the further bearing part is also removable inwardly of the ship, and a sealing arrangement is provided which prevents the entry of water between the shaft and the stern frame on removal of the further bearing part. Preferably, the further bearing part is adjustable in position in the stern frame while the ship is afloat, e.g., while the ship is at loaded draught.

The sealing arrangement may comprise a radially or axially expansible inflatable seal or both and may be provided between the hub of the propeller and the stern frame.

Preferably, a mechanical seal at least part of which preferably extends around the aftermost end of the split bearing is provided which normally prevents the entry of water through the opening and which is not disturbed by removal of the first bearing part.

The mechanical seal may be provided between a propeller flange on the shaft and the bearing. The further part of the bearing may be the lower half of the bearing and have a sealing portion extending around the upper bearing half and between a part of the mechanical seal and a sealing face on the stern frame. This sealing portion may be in one piece with the lower bearing half or may be a separate member secured to the lower bearing half, and may be sealed to a radial sealing portion on the upper bearing half. The mechanical seal may be provided between the lower bearing half and the sealing portion thereon.

The stern frame may be provided with a cradle for supporting the propeller and the shaft on removal of the further bearing part.

The stern frame may have a portion arranged to serve as a lifting jack support during removal of the lower bearing part and lifting jacks, which may be hydraulic, may be provided preferably removably, between the support and the lower bearing part.

A track may be provided beneath the lower bearing part along which rollers supporting the lower bearing part run during withdrawal and return of the lower bearing part. The rollers may form parts of carriages insertable between the track and the lower bearing part.

The bearing may be normally supported on chocks which are removable to facilitate the removal of the lower bearing part.

A drive mechanism may be provided for moving the lower bearing part to and from its normal position in the stern frame. A vertically displaceable support, e.g., a table on a scissor mechanism, may be provided forward of the stern frame to facilitate movement of the lower bearing part to and from the shaft.

Adjustable lateral stabilizing means, e.g., jacks, may be provided between the sides of the lower bearing part and the stern frame.

Hydraulic lifting means, which may be mounted for travel along an upper track, may be provided to facilitate the removal of the upper bearing part.

Taper wedges may be provided at opposite sides of the further bearing part for locating the latter in its normal operational position.

The invention will be more readily understood from the following description of an embodiment thereof given by way of example with reference to the accompanying drawing, in which.

Figure 1:
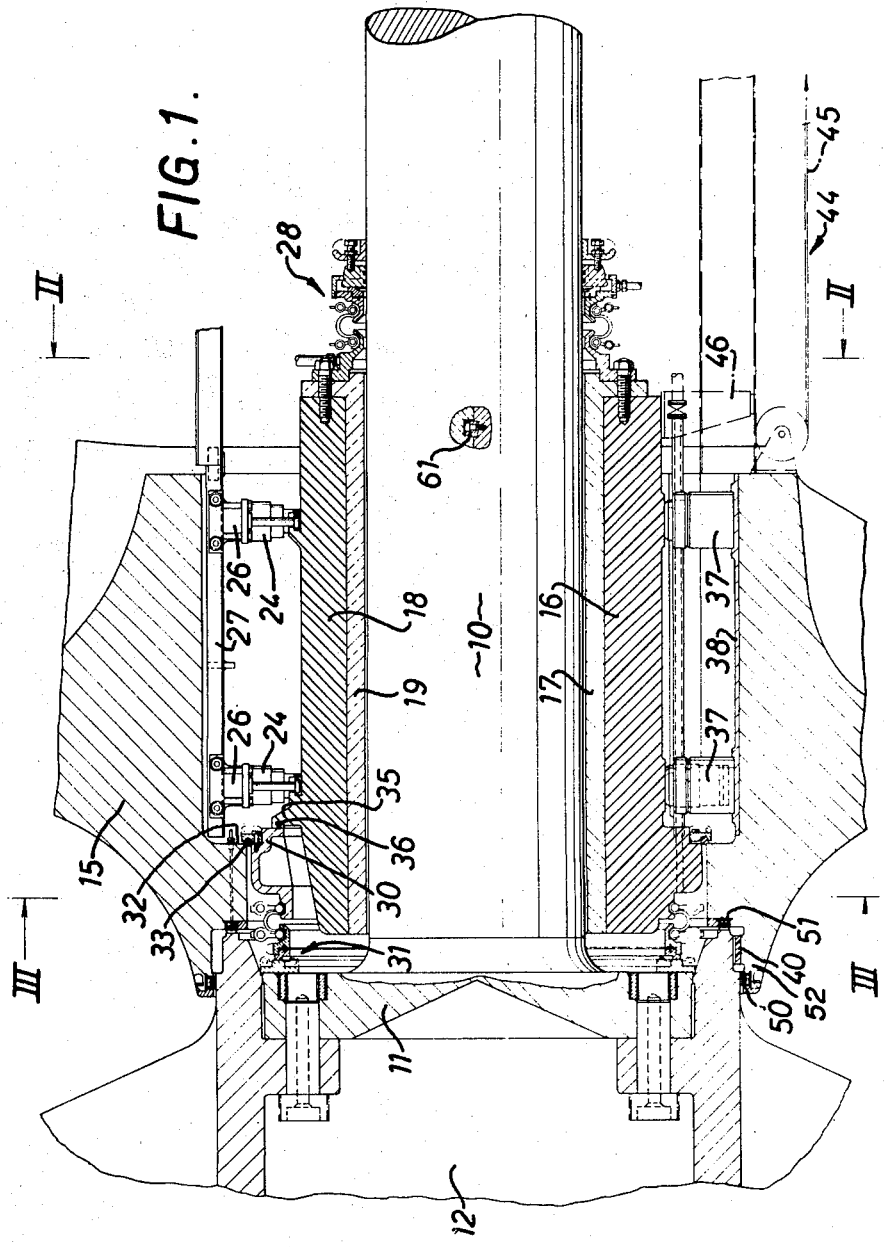
FIG. 1 shows a view taken in longitudinal section through a propeller shaft bearing arrangement.

As shown in the drawings, a propeller shaft 10 has a flange 11 to which a propeller 12 is secured by propeller mounting bolts 13, and extends into an opening in the stern frame 15 of a ship.

The shaft 10 is supported in a split bearing of which the lower half is formed by a housing part 16 with a lining 17, and the upper half by a bearing cap 18 with a lining 19.

Figure 2:
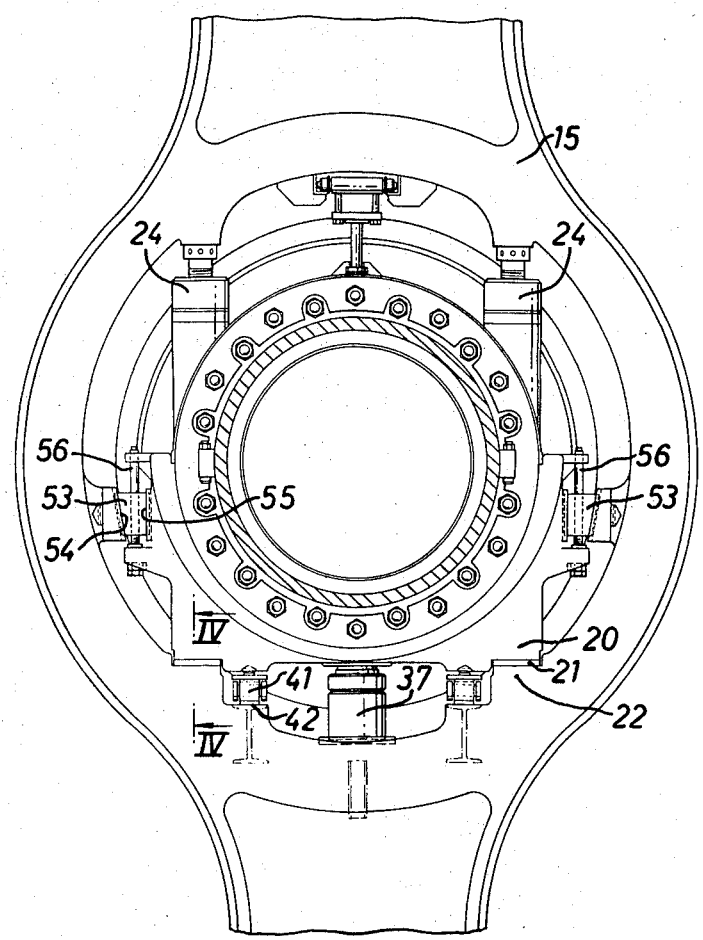
FIG. 2 shows a view taken along the line II—II of FIG. 1.
Figure 3:
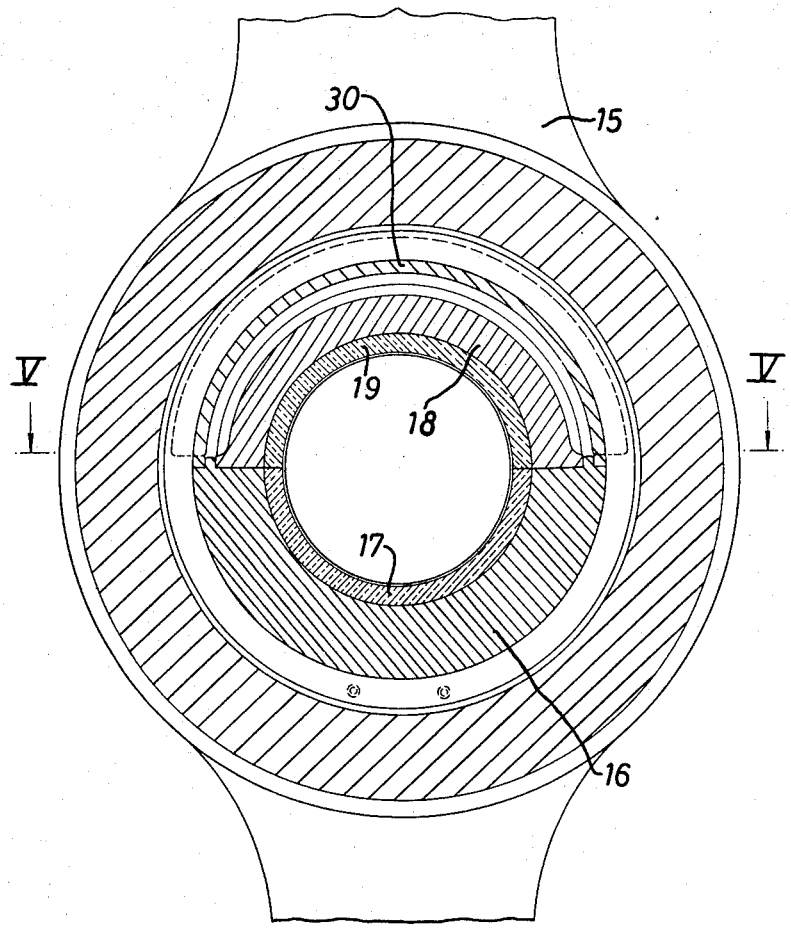
FIG. 3 shows a view taken along the line III—III of FIG. 1.
Figure 4:
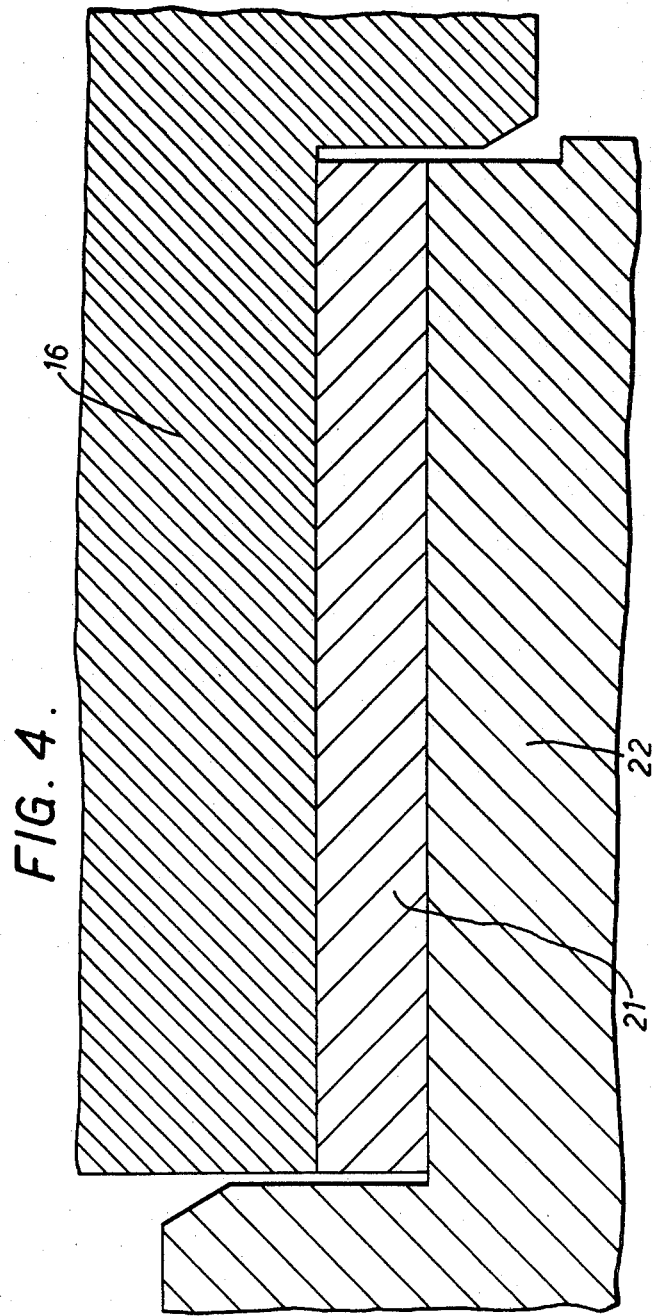
FIG. 4 shows on a larger scale a part of the view partial longitudinal section taken along the line IV—IV of FIG. 2.

The housing part 16 is formed at each side with a shoulder 20 which shoulders 20 are supported by means of chocks 21 (FIG. 2) on shoulders 22 formed on the stern frame 15, and hydraulic jacks 24 are provided between the stern frame 15 and the bearing cap 18 for securing the bearing in position.

The bearing cap 18 can be removed to allow inspection of the shaft by releasing and removing the hydraulic jack 24 and then lifting the bearing cap 18 by retracting hydraulic lifting jacks 26. The lifting jacks 26 can run on rollers along an upper track 27 to carry the bearing cap 18 forwardly from the stern frame 15.

The forward end of the split bearing is sealed to the shaft by a mechanical seal 28, which has of course to be removed before the bearing cap can be removed.

A semi-annular radial sealing portion 30 bolted to the housing part extends upwardly therefrom around the rear end of the bearing cap 18, and a mechanical seal 31 seals the flange 11 to the lower half of the housing part 16 and to the radial sealing portion 30, which are in turn sealed to a radial sealing face 32 on the stern frame 15 by a sealing ring 33. The mechanical seal 31, the radial sealing portion 30 and the sealing ring 33 form parts of a sealing arrangement which prevents the entry of sea water while the bearing is in use and also when the bearing cap 18 is removed as described above to allow inspection of the shaft, which can be done without disturbing this sealing arrangement or the shaft.

Figure 5:
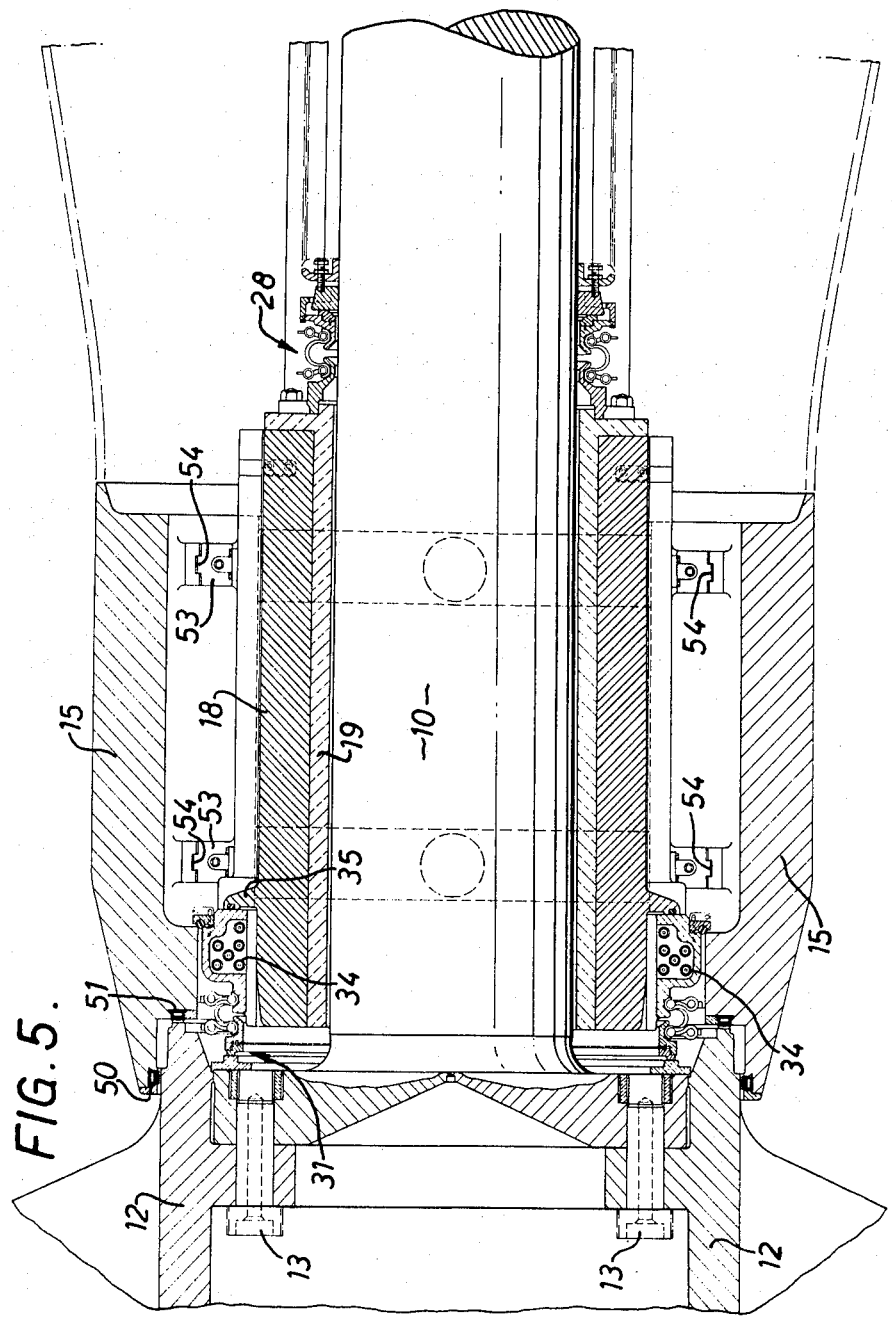
FIG. 5 shows a view taken in section along the line V—V of FIG. 3.

While in the present embodiment the radial sealing portion 30 is secured by bolts 34 (FIG. 5) to the housing part 16, it may be formed in one piece therewith.

The bearing cap 18 is formed with a further radial sealing portion 35 which is sealed by a resilient seal member 36 to the radial sealing portion 30.

Beneath the housing part 16, there is a space between the housing part 16 and the stern frame 15 into which hydraulic jacks 37 can be inserted on a slipper 38. By expanding the hydraulic jacks 37, the housing part 16 can be lifted from the chocks 21, which can then be removed from between the housing part 16 and the shoulders 22. On subsequent retraction of the hydraulic jacks 37, the housing part 16 is lowered until the propeller 12 comes to rest in a cradle 40 made of Tufnol (Registered Trade Mark) or like material. The housing part 16 comes to rest on roller carriages 41 which can run along lower tracks 42 to carry the housing part 16, together with its lining 17, forwardly from the normal position in which it is shown in FIG. 1. The forward movement of the housing part 16 and lining 17 may be effected by means of a withdrawal and return gear indicated generally by reference numeral 44, which may comprise a motor driven endless chain 45 connected by an arm 46 to the housing part 17.

When the housing part 16 has thus been withdrawn forwardly, the housing part 16, its lining 17, and the mechanical seal 31 can be examined, serviced or, if required, replaced, and the propeller mounting bolts 13 can be examined and, if necessary, tightened from within the ship and while the ship is afloat.

To prevent the entry of sea water while this is done, inflatable seals 50 and 51 are inflated. The inflatable seal 50 is provided in a rope guard 52 formed on the stern frame 50 and when inflated presses radially inwardly, against the periphery of the hub of the propeller 12. The inflatable seal 51 is also provided in the rope guard 52 when inflated presses axially against the forward end of the propeller hub. The inflatable seals 50 and 51 are resilient and maintain sealing contact with the propeller hub throughout the small movement of the latter which occurs during the above described withdrawal of the housing part 16.

When the housing part 16 has been moved forwardly as described above, it can be supported on a table (not shown) which is in turn supported on a scissors mechanism (not shown) by means of which the table can be lowered and raised to facilitate inspection and, if required, replacement of the housing part 16 or its lining 17.

The return of the housing part 16 to its normal position is the reverse of the above described withdrawal.

A wedge member 53 at each side of the bearing is engaged in vertical keyways 54 and 55 formed in the stern frame 15 and the housing part 16. A bolt 56 in threaded engagement with each wedge member 53 is rotatably secured to the housing part 16. The wedge members 53 are urged downwardly by rotation of the bolts 56 to effect lateral axial location of the housing part 16 relative to the stern frame 15. By this means, the position of the housing part 16 relative to the stern frame can be adjusted vertically and horizontally, i.e., fore-and-aft and athwartship.

With the above described bearing arrangement the bearing cap 18 and its lining 19 can be readily removed and if required replaced while the ship is afloat and without disturbing the shaft 10 and the mechanical seal 31 to allow inspection of the shaft 10 as far as the flange 11, the inboard side of the mechanical seal 31 and the upper bearing half.

By also removing the lower bearing half and the mechanical seal 31 as described above, these can be examined and if necessary replaced without uncoupling the shaft 10 or propeller 12 while the ship is afloat and without drydocking the ship.

The forward mechanical seal 28 can also of course be replaced while the ship is afloat.

By reversing the propeller mounting bolts 13, these bolts can also be replaced while the ship is afloat, and if necessary the propeller 12 can be replaced without drydocking the ship.

The after mechanical seal 31 is radially outwardly spaced from the shaft 10, thus allowing the splitbearing to extend rearwardly for supporting the shaft as far rearwardly as the propeller flange 11. In a modification of the illustrated embodiment, the split bearing may project rearwardly beyond the mechanical seal 31.

While in the present embodiment two support shoulders 22 are provided, it is possible to vary the number or position of support surfaces provided on the stern frame for supporting the housing part 16, and to use these surfaces to support the housing part 16, or act in co-operation with other surfaces, during withdrawal of the housing part 16. By altering the shape of the chocks 21 the alignment and position of the housing part 16 in the stern frame 15 can be adjusted.

The hydraulic lifting jacks 26 may be replaced by mechanical jacks, and the withdrawal and return gear 44 may be modified, e.g., by using other hydraulic, electrical or mechanical means and/or by locating this gear closer to the axis of the shaft.

Axial location of the bearing cap 18 is ensured by tapered keys, of which one is indicated at 61, set into the housing part 16, which cause compression of the sealing member 36.

I claim:

1. A propeller shaft bearing arrangement comprising a split bearing mounted in the stern frame of a ship and supporting a propeller shaft extending through an opening in the stern frame, the split bearing having an upper bearing part and a lower bearing part, means operatively connected to the upper bearing part for lifting the upper bearing part away from its normal operating position over the shaft and for moving it longitudinally inward of the ship, means operatively connected to the lower bearing part for lowering said lower bearing part away from its normal operating position below the shaft and for moving said lower bearing part longitudinally inward of the ship, means mounted between said frame and said lower bearing part for radially adjustable securing said lower bearing part in said opening, and seal means between the shaft and the stern frame operable to prevent the entry of water between the shaft and the stern frame on removal of said bearing parts.

2. A propeller shaft lower bearing part arrangement as claimed in claim 1, wherein the means for radially adjustable securing said bearing in said opening includes taper wedges at opposite sides of said lower bearing part for adjustable locating the latter in its normal operational position.

3. A propeller shaft bearing arrangement as claimed in claim 1, wherein the sealing means comprises an inflatable seal.

4. A propeller shaft bearing arrangement as claimed in claim 3, wherein the seal means is radially expansible by inflation to seal said opening.

5. A propeller shaft bearing arrangement as claimed in claim 3, wherein the seal means is axially expansible by inflation to seal the opening.

6. A propeller shaft bearing arrangement as claimed in claim 3, wherein the seals means is provided between the stern frame and the hub of a propeller on the shaft.

7. A propeller shaft bearing arrangement as claimed in claim 1, wherein said lower part of the bearing is provided with a seal sealing the split bearing to the stern frame.

8. A propeller shaft bearing arrangement as claimed in claim 8, wherein the seal comprises a sealing portion secured to said lower bearing part at opposite sides of the shaft and extending around said upper bearing part.

9. A propeller shaft bearing arrangement as claimed in claim 1, wherein rollers are provided for supporting said lower bearing part during movement of the latter to and from its normal operational position.

10. A propeller shaft bearing arrangement as claimed in claim 9, wherein the rollers form parts of carriages disposed between said lower bearing part and a track provided on the stern frame.

11. A propeller shaft bearing arrangement as claimed in claim 9, wherein hydraulic jacks are provided for lifting said lower bearing part to allow installation of the rollers beneath said lower bearing part.

12. A propeller shaft bearing arrangement as claimed in claim 1, wherein a drive mechanism is provided for moving said lower bearing part to and from its normal position.

13. A propeller shaft bearing arrangement as claimed in claim 1, wherein hydraulic lifting means mounted for travel along a path above the shaft are provided for lifting said upper bearing part.

* * * * *